Patented July 10, 1945

2,379,912

UNITED STATES PATENT OFFICE 2,379,912

NUCLEIC ACID

Louis Laufer, New York, N. Y., assignor to Schwarz Laboratories, Inc., New York, N. Y.

No Drawing. Application February 28, 1942, Serial No. 432,903

24 Claims. (Cl. 260—210)

As conducive to a clear understanding of the invention, it is noted that nucleic acid bearing substances usually contain a wide variety of protein constituents which do not respond to any one simple treatment for the separation thereof from the nucleic acid constituents. Accordingly, elaborate purification becomes necessary for the separation of the nucleic radical from precipitates that contain much protein matter admixed therewith and especially is this so where the precipitate is gelatinous. The consequence is that the extraction process is difficult and the yield of nucleic acid radical is relatively low, since some part of such radicals will not lend itself to separation from the protein residue.

It is among the objects of the present invention to derive from yeast, thymus cells, molds or other biological sources a maximum yield of refined nucleic acid or salt thereof, substantially free from protein or other contamination, by resort to a simple inexpensive and expeditious process that eliminates the need for elaborate purification.

A more specific object is to avoid the loss of nucleic acid either in the course of precipitating and filtering out proteins, or by destruction under the combined effect of caustic and heat, and also greatly to economize the use of alcohol in carrying out the process.

According to the present invention in its broadest aspects, the extraction is effected in a sequence of steps, each of which involves such control of pH, temperature and solubility that at each stage some one or more of the proteins are effectively separated with respect to the nucleic acid radicals, that is, either the protein matter or the nucleic acid radical is in solution while the other is precipitated. Such mode of preparation is to be carried on in a sequence of steps until pure nucleic acid is finally yielded and without the need for elaborate purification procedure.

Acidification with acetic acid after the initial alkali treatment and preparatory to adding iron compounds for precipitation of iron nucleate, not only requires large amounts of such acid by reason of the low ionization value thereof, but the separation of such iron nucleate is fraught with difficulty. For in this procedure, especially when relatively large amounts of iron salts are used, a major proportion of the precipitate may be gelatinous and relatively insoluble basic iron acetate, which tends to occlude much of the precipitated iron nucleate, rendering the separation of the iron nucleate from the basic iron acetate very difficult and resulting in a poor yield of a product, which at best is contaminated with protein.

According to the present invention, the acid used following the initial alkali treatment in extracting the nucleic acid forms a soluble rather than a gelatinous iron salt, so that the precipitate of iron nucleate is not occluded and is free from contamination other than with a little iron proteinate, which is readily eliminated as an incident to the conversion of the iron nucleate to nucleic acid or its salts. The proportion of iron proteinate in the precipitate is but minor, because in the initial alkali and acid treatment, according to the present invention, the major portion of the protein was precipitated out by boiling at substantially the iso-electric point of such protein.

In proceeding with the process, the iron nucleate precipitate is dissolved in alkali and boiled, so that the alkali salt of the nucleic acid is formed, and the heat coagulable albumens are brought down. Thereupon acid is added substantially to bring the solution of the iso-electric point of the remaining proteins, thereby to precipitate and remove the same as well as the iron hydroxide by filtration.

The filtrate contains the soluble alkali salt of nucleic acid, with only traces of protein and iron in solution. A sufficient quantity of soluble phosphate is now added for precipitating out the remaining iron and sufficient soluble acetate or chloride or both are also added to repress the precipitation of the remaining traces of protein in the final step of precipitating the nucleic acid or its alkali salt. For this purpose, sufficient hydrochloric acid is added to determine the character of the precipitate, whether in the form of the acid or the alkali salt, and the precipitation occurs upon the addition of alcohol.

The foregoing general description sets forth the generic features of the invention as applied to the extraction of nucleic acid from biologic cells, such as those of yeast or of the thymus or pancreatic glands or molds or the like. Specific controls of such process particularly applicable to the extraction of nucleic acid from yeast will now be set forth.

The yeast is treated with alkali, desirably sodium hydroxide, to free the nucleic acid from the cells and is then treated with mineral acid, desirably concentrated hydrochloric acid, to bring the pH to a value close to the iso-electric point of much of the protein matter, which in the case of yeast is usually between 4.5 and 5.1. Upon subsequent boiling, a maximum amount of the protein content will be precipitated out, while the nucleic acid content remains in solution.

The filtrate is now treated with iron chloride, desirably ferric chloride, to lower the pH to between 2.0 and 3.5, preferably to about 2.5 at which point the nucleic acid is precipitated in the form of iron nucleate, together with iron compounds of other ingredients in the filtrate such as iron proteinate.

A suspension of the iron precipitate in water is now treated with caustic, desirably sodium hydroxide, to raise the pH to a definite value of 7.0 to 8.0, which value is maintained by continuing to add the caustic while boiling. A high temperature glass electrode may be used for pH control. That operation results in separation of the iron as an insoluble precipitate of iron hydroxide as well as the coagulation of additional protein fractions in the yeast, while the sodium salt of nucleic acid resulting from the reaction and small remnants of proteins pass into solution.

The pH is now reduced by the addition of mineral acid, preferably hydrochloric acid, desirably to a pH of from 4.5 to 4.7, substantially the isoelectric point of the water soluble non-heat coagulable proteins present in the yeast, which are thus brought down. The insoluble iron hydroxide with other precipitated matter and with such protein as it will adsorb are now filtered out. The filtrate will contain the soluble sodium nucleate with little more than traces of protein and iron in solution.

A soluble phosphate, desirably sodium phosphate, one per cent by weight, is now added to precipitate the remaining iron as iron phosphate. Sodium chloride, desirably five per cent, and sodium acetate, desirably one per cent by weight, are also added to complete the removal of iron phosphate as well as additional traces of certain proteins and also to repress the precipitation of any traces of other proteins with the product in subsequent steps. By adding hydrochloric acid to lower the pH to from 3.2 to 3.5, sodium nucleate is precipitated out, which is removed centrifugally or by filtration and then washed with alcohol and air dried, to yield the final refined product, which is free from protein or other contamination. By reducing the pH to from 1.0 to 1.5 prior to adding alcohol, the yield will be nucleic acid, rather than the sodium salt thereof. For intermediate pH's, mixtures of the acid and the sodium salt thereof will be yielded.

While the foregoing description is believed to be sufficiently detailed to enable those skilled in the art to practice the invention, specific directions will now be given to assure complete compliance with the statutory requirements. In preparing the nucleic compound in pure form from yeast, the procedure may be as follows: Mix pressed yeast, 20 parts by weight with 40 parts of water and 1 part caustic soda and stir, desirably at room temperature for about ten minutes. The destruction of part of the nucleic acid incurred in heating in alkali medium is thus obviated. Add hydrochloric acid to bring the pH down to between 4.5 and 5.1. Boil for 15 minutes or more, until a skin forms similar in appearance to that on boiling milk. In this operation, most of the protein will precipitate, but substantially all of the nucleic acid will remain in solution. While at a pH substantially below 4.5, protein is also effectively precipitated, it carries down with it much of the nucleic acid and the yield is therefore, materially lower. Where the pH is much above 5.1, a substantial proportion of protein remains in solution, with the nucleic acid, and refining difficulties are encountered.

To the clear filtrate, ferric chloride is added until the solution has a pH between 2.0 to 3.5, the optimum value being about 2.5. In this operation, the nucleic acid is precipitated as iron nucleate together with a small amount of iron proteinate and other iron compounds.

The resultant precipitate is now suspended in about twice its weight of water and a 50 per cent solution of sodium hydroxide is added, with agitation, until the pH has risen to between 7.0 and 8.0. The solution is boiled and is maintained at such pH by adding sodium hydroxide. In this operation, the iron is precipitated in the form of insoluble iron hydroxide while the nucleic acid and small amounts of protein pass into solution. The boiling is continued until the foam is broken, which indicates the complete coagulation of the heat coagulable albumen constituent. If the pH at this stage of the operation is much below 7.0 the conversion of iron nucleate to soluble sodium nucleate is difficult to complete while, if it is much above 8.0 degeneration of the nucleate by hydrolysis takes place. In either case there would be a loss of yield.

Hydrochloric acid is now added to reduce the pH to from 4.5 to 4.7 which is close to the isoelectric point of the water soluble non-heat coagulating proteins such as zymo-casein of yeast, which are thus also precipitated out.

After cooling the mass to room temperature, the precipitate of iron hydroxide and of protein material is filtered out. The fact that some of the proteins will adhere to the iron hydroxide contributes to the completeness of the separation. The clear filtrate, therefore, will contain the soluble sodium nucleate with but slight amounts, little more than traces of protein and iron in solution.

Upon mixing the filtrate with soluble inorganic salts, including sodium phosphate about one per cent by weight, all of the iron in solution will precipitate out as insoluble iron phosphate. Precipitation of the remaining traces of protein is prevented in the subsequent precipitation of the nucleic acid, by adding to the solution in addition to the phosphate, one or more salts that repress such protein precipitation. Desirably the additional salts for this purpose, are sodium chloride five per cent and sodium acetate one per cent. The inorganic salts thus added, should aggregate no less than seven per cent by weight, as otherwise the precipitation of some of the small amounts of protein left in solution may not be wholly repressed.

To the filtrate hydrochloric acid may now be added until the pH has a value between 3.2 and 3.5 and then alcohol, desirably ethyl alcohol is added in volume equal to that of the filtrate, which results in a precipitate of water soluble sodium nucleate. If the pH is less than 3.2 the precipitate will be a mixture of soluble sodium nucleate and insoluble nucleic acid. Insoluble nucleic acid may be precipitated substantially free of the sodium nucleate by adjusting the pH to between 1.0 and 1.5. Thus the character of nucleic acid radical extracted may be controlled.

The precipitate may be separated by filtration or centrifugal action and then washed with 95 per cent alcohol until free of foreign material and air dried to the desired, refined, white powder, free from protein or other contamination. The yield is one to one and one-half per cent of the weight of the original pressed yeast.

It will be readily understood by those skilled in the art that the procedure above specifically set forth could be readily applied to the extraction of nucleic acid from thymus cells, pancreatic cells, molds or other biologic substances, by modification of the pH controls in accordance with the character of the protein substances present in each such nucleic acid bearing material.

Thus, it will be seen that by the present process, the compound of nucleic acid radicals either in the form of the nucleic acid or as the alkali metal salt thereof is obtained from the biologic cells bearing the same, in substantially pure form, free of protein or other contamination, without the need for any elaborate purification process. The process is relatively expeditious and efficient with high yield and requires a minimum use of alcohol reagent.

As many changes could be made in the above process, and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. In the process of extracting compounds with nucleic acid radical, the treatment of the nucleic acid bearing biologic substance with alkali substantially in the absence of applied heat, the addition of mineral acid to reach a pH corresponding to the iso-electric point of the major portion of the proteins and the boiling of the resultant body to precipitate out much of the protein content and to leave a clear filtrate for further treatment.

2. The process of extracting compounds with nucleic acid radical, comprising the treatment of the nucleic acid bearing biologic substance with alkali substantially in the absence of applied heat, the adjustment of the pH by the addition of mineral acid to between 4.5 and 5.1, corresponding to the iso-electric point of the major portion of the proteins, filtering out the precipitate and recovering the nucleic acid from the clear filtrate.

3. The process of extracting compounds with nucleic acid radical, comprising the treatment of the nucleic acid bearing biologic substance with sodium hydroxide for a period in the order of ten minutes, substantially in the absence of applied heat, adjusting the pH to a value between 4.5 and 5.1 by the addition of concentrated hydrochloric acid, thereby to precipitate the major portion of the proteins, and recovering the nuclei acid from the filtrate.

4. The process of extracting compounds with nucleic acid radical, comprising the treatment of yeast cells with sodium hydroxide for a period in the order of ten minutes, substantially in the absence of applied heat, adjusting the pH to a value between 4.5 and 5.1 by the addition of concentrated hydrochloric acid, and boiling for fifteen minutes or more, thereby to precipitate the major portion of the proteins, and treating the filtrate to recover the nucleic acid therefrom.

5. The process of extracting compounds with nucleic acid radical, which comprises treating the nucleic acid bearing biologic substance with alkali, at substantially room temperature, adding mineral acid to attain a pH between 4.5 and 5.1, boiling, filtering out the proteins brought down and treating the filtrate with soluble iron salts to bring down a precipitate largely of iron nucleate, dissolving said precipitate, precipitating out the iron, and recovering the nuclei acid from the filtrate.

6. The process of extracting compounds with nucleic acid radical, which comprises treating the nucleic acid bearing biologic substance with alkali, at substantially room temperature, adding mineral acid to attain a pH between 4.5 and 5.1, boiling, filtering out the proteins brought down and treating the filtrate with soluble iron salts to bring down a precipitate largely of iron nucleate, suspending the iron salt precipitate in water, treating with alkali and boiling, thereby to precipitate the iron hydroxide, to coagulate albumen and to dissolve the nucleic acid and remaining proteins, and recovering the nucleic acid from the filtrate.

7. The process of extracting compounds with nucleic acid radical, which comprises treating the nucleic acid bearing biologic substance with alkali at substantially room temperature, adding mineral acid to attain a pH between 4.5 and 5.1, boiling, filtering out the proteins brought down and treating the filtrate with soluble iron salts to bring down a precipitate largely of iron nucleate, suspending the iron salt precipitate in water, treating with alkali and boiling, thereby to precipitate the iron hydroxide, to coagulate albumen and to dissolve the nucleic acid and remaining proteins, adding mineral acid to reduce the pH to the iso-electric point of non-heat coagulable proteins and filtering the same out together with the iron hydroxide precipitate, to yield a filtrate largely of soluble sodium nucleate with slight amounts of proteins and iron in solution.

8. The process of extracting substantially pure nucleic acid from a solution containing nucleic acid and small proportions of iron and protein, which consists in adding soluble phosphate to bring down the iron as iron phosphate and in also adding soluble sodium salts of the type that repress the precipitation of proteins in proportion sufficient to perform that function, then adding acid to bring the pH to a value between 1.0 and 3.5 and admixing the filtrate with substantially an equal volume of alcohol, yielding a precipitate consisting substantially solely of nucleic acid and salts thereof.

9. The combination recited in claim 8 in which the pH is adjusted to a value between 3.2 and 3.5, thereby yielding a precipitate substantially solely of water soluge sodium nucleate.

10. The combination recited in claim 8 in which the pH is adjusted to a value between 1.0 and 1.5, thereby yielding a precipitate substantially solely of water-insoluble nucleic acid.

11. The process of extracting compounds with nucleic acid radical, which comprises treating the nucleic acid bearing biologic substance to bring the solution to substantially the iso-electric point of a major portion of the proteins, boiling to precipitate said proteins, treating the filtrate with iron chloride in the absence of acetic acid, suspending the resultant precipitate in water, treating the same with caustic to precipitate iron hydroxide and to bring the nucleic acid and proteins into solution and boiling to coagulate certain of the albumens, adding acid to bring the solution substantially to the iso-electric point of soluble non-heat coagulable proteins in the mass, filtering off the iron hydroxide and the precipitated organic matter, with the recovery of a filtrate containing soluble sodium nucleate with small amounts of iron and protein in solution therein.

12. The process of extracting compounds with nucleic acid radical, which comprises treating the nucleic acid bearing biologic substance to bring the solution to substantially the iso-electric point of a major portion of the proteins, boiling to precipitate said proteins, treating the filtrate with iron chloride in the absence of acetic acid, suspending the resultant precipitate in water, treating the same with caustic, to precipitate iron hydroxide and to bring the nucleic acid and proteins into solution and boiling to coagulate certain of the albumens and filtering off the iron hydroxide and the precipitated organic matter, with the recovery of a filtrate containing soluble sodium nucleate with small amounts of iron and protein in solution therein.

13. The process of extracting compounds with nucleic acid radical, which comprises treating the nucleic acid bearing biologic substance with alkali and bringing the solution to substantially the iso-electric point of a major portion of the proteins, boiling to precipitate said proteins, treating the filtrate with iron chloride in the absence of acetic acid, suspending the resultant precipitate in water, treating the same with caustic to precipitate iron hyroxide and to bring the nucleic acid and proteins into solution and boiling to coagulate certain of the albumens, adding acid to bring the solution substantially to the iso-electric point of soluble non-heat coagulable proteins present, filtering off the iron hydroxide and the precipitated organic matter, with the recovery of a filtrate containing soluble sodium nucleate with small amounts of iron and protein in solution therein, and adding to the filtrate sodium phosphate to precipitate the iron, and soluble alkali salts of the character to repress the precipitation of proteins, adjusting the pH of the filtrate for selective precipitation of the nucleic acid either as such or as a salt thereof, and adding an equal volume of alcohol to effect such precipitation and removing the precipitate.

14. The combination recited in claim 13 in which the original protein precipitation is effected at a pH between 4.5 and 5.1.

15. The combination recited in claim 13 in which the ferric chloride is added to bring the filtrate to a pH between 2.0 and 3.5.

16. The combination recited in claim 13 in which the iron chloride is in the ferric form and is added in such amount as to bring the filtrate to a pH of about 2.5.

17. The combination recited in claim 13, in which the caustic is added to the suspension of iron salt in amount to bring the pH to between 7.0 and 8.0 and is maintained at such value throughout the boiling.

18. The combination recited in claim 13 in which the solution is brought to a pH of between 4.5 and 4.7 for removal of the non-heat coagulable proteins which have an iso-electric point in that range.

19. The combination recited in claim 13, in which the salts added at the final stage for removal of iron and repressing the precipitation of proteins, consists of approximately the following ingredients in the following proportions; sodium chloride 5 per cent, sodium acetate 1 per cent and sodium phosphate 1 per cent.

20. The process of extracting compounds with nucleic acid radicals, substantially free of protein, which consists in treating yeast cells with alkali substantially in the absence of applied heat, adding mineral acid to bring the pH down to between 4.5 and 5.1, then applying heat, adding iron chloride to the filtrate in amount to bring the pH to between 2.0 and 3.5, filtering out the resultant precipitate, suspending the same in water, adding alkali to raise the pH to between 7.0 and 8.0, boiling while adding alkali to maintain the pH at substantially said value, reducing the pH with mineral acid to between 4.5 and 4.7, filtering and adding inorganic salts to the filtrate to precipitate all of the iron in solution, and finally adjusting the pH to between 1.0 and 3.5 and precipitating the compounds with the nucleic radicals from the filtrate by adding a substantially equal volume of alcohol.

21. The combination recited in claim 20 in which the pH is adjusted to a value between 3.2 and 3.5, thereby yielding a precipitate substantially solely of water soluble sodium nucleate.

22. The combination recited in claim 20 in which the pH is adjusted to a value between 1.0 and 1.5, thereby yielding a precipitate substantially solely of water insoluble nucleic acid.

23. The process of extracting compounds with nucleic acid radical, which comprises treating the nucleic acid bearing biologic substance with iron chloride to bring down a precipitate largely of iron nucleate with small amounts of other iron compounds, treating the filtrate to dissolve the nucleic acid and remaining proteins and to convert the iron to insoluble iron hydroxide, coagulating the albumen, altering the pH to substantially the iso-electric point of the water soluble non-heat coagulable proteins, and thereby precipitating the same, treating the clear filtrate with inorganic salts including phosphates to precipitate out all remaining iron compounds and precipitating the filtrate with alcohol at a definite pH to yield a precipitate of compounds with the nucleic acid radical.

24. The process of extracting compounds with nucleic acid radicals, which consists in treating the nucleic acid bearing biologic substance with alkali substantially in the absence of applied heat, adjusting the pH by the addition of hydrochloric acid and boiling until a considerable proportion of the protein is precipitated out, adding iron chloride to the filtrate until substantially all of the nucleic acid is precipitated out as iron nucleate, suspending the precipitate in water, adding alkali to raise the pH to a definite value, and keeping the solution at said value while boiling the same, for dissolving the nucleic acid and remaining proteins and bringing down the iron as an insoluble precipitate, boiling until the albumens are coagulated, reducing the pH of the filtrate to substantially the iso-electric point of the water soluble non-heat coagulating proteins for precipitating the latter, filtering out the precipitate, mixing the filtrate with inorganic salts including a phosphate and thereby precipitating out substantially all iron in solution, while leaving the nucleic acid compounds in solution and then precipitating the latter by mixing the filtrate with alcohol at a definite pH.

LOUIS LAUFER.

CERTIFICATE OF CORRECTION.

Patent No. 2,379,912.  July 10, 1945.

LOUIS LAUFER.

It is hereby certified that error appears in the printed specification of the above numbered patent requiring correction as follows: Page 1, second column, line 22, for the words "solution of" read --solution to--; page 3, first column, line 57, claim 3, and second column, line 3, claim 5, for "nuclei acid" read --nucleic acid--; line 52, claim 9, for "solugle" read --soluble--; and that the said Letters Patent should be read with this correction therein that the same may conform to the record of the case in the Patent Office.

Signed and sealed this 16th day of October, A. D. 1945.

Leslie Frazer (Seal)  First Assistant Commissioner of Patents.